Sept. 27, 1938.  F. T. CHRISTIAN  2,131,532
VEHICLE BRAKE
Filed April 16, 1937

Witness:
Burr W. Jones

INVENTOR.
Frank T. Christian
BY Clinton S. Janes
ATTORNEY.

Patented Sept. 27, 1938

2,131,532

UNITED STATES PATENT OFFICE 2,131,532

VEHICLE BRAKE

Frank T. Christian, Elmira, N. Y., assignor to Eclipse Machine Company, Elmira, N. Y., a corporation of New York Application April 16, 1937, Serial No. 137,316

3 Claims. (Cl. 188—250)

The present invention relates to vehicle brakes and more particularly to coaster brakes for bicycles, velocipedes and the like.

In that type of coaster brake which incorporates an expansible cylindrical brake member such as used in the device known commercially as the "Morrow" brake, constructed substantially in accordance with the disclosure in the patent to Morrow No. 906,149, patented December 8, 1908, a certain amount of difficulty has been encountered in connection with fracturing of the brake cylinder due to the cumulative effect of repeated expansion and contraction thereof. Extended investigation of this phenomenon has indicated that such failures are due to a fatigue of the metal at points of localized stress, in conjunction with the existence of minute superficial imperfections or scratches on the hardened surfaces of the brake.

It is an object of the present invention to provide a novel expansible brake member which is efficient and reliable in operation over long periods of use.

It is another object to provide such a device which is so formed as to prevent localization of stresses.

It is a further object to provide such a device which is so constructed as to avoid superficial formations conducive to the start of fractures or lines of failure.

Figure 1:
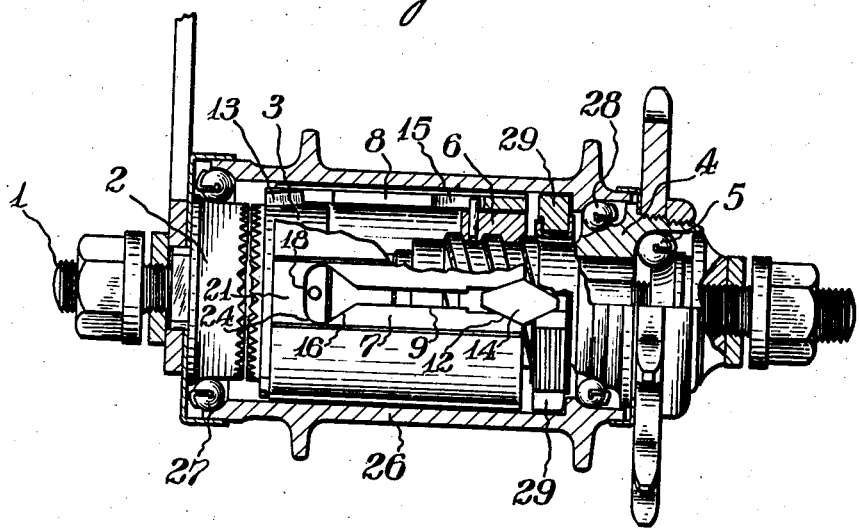
Figure 2:
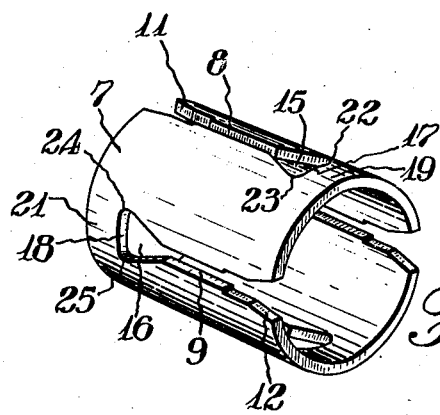

Further objects and advantages will be apparent from the following description taken in connection with the accompanying drawing in which:

Fig. 1 is a side elevation partly broken away and in section of a coaster brake incorporating a preferred embodiment of the invention; and Fig. 2 is a detail in perspective of an expansible brake cylinder constructed in accordance with the invention.

Referring first to Fig. 1 of the drawing, there is illustrated a coaster brake of the Morrow type including a fixed axle shaft 1, a brake anchor member 2 threaded thereon, a brake supporting and actuating member 3 loosely mounted on the axle and adapted to be moved into clutching engagement with the anchor member, a driving member 4 journalled on the axle as indicated at 5 and having threaded thereon a brake actuating nut 6. A cylindrical brake member 7 rests at its ends on the brake actuating members 3 and 6 and is provided with longitudinal slots 8 and 9 extending alternately from opposite ends of the brake cylinder and having flared portions 11 and 12 adapted to be engaged by tapered expanding lugs 13 and 14 on the clutch operating members 3 and 6 respectively.

According to the present invention, the slots 8 and 9 terminate in triangular openings 15 and 16, the bases 17 and 18 of which triangles are arranged circumferentially of the cylinder whereby strips or bands 19 and 21 of substantially uniform cross section are formed joining the segments into which the cylinder is divided by the slots 8 and 9. The bases 17, 18 of the triangular openings are merged smoothly into the sides thereof by means of curved fillets 22, 23, 24 and 25, and the surfaces of the bases and fillets are smoothed and polished and their edges rounded to ensure that there are no sharp edges, scratches or pits which might form the starting point of a crack or line of failure.

A hub member 26 having an interior cylindrical surface of slightly greater diameter than the normal diameter of the brake member 7 is journalled at one end on the anchor member 2 as indicated at 27, and at its other end on the driving member 4 as indicated at 28. A driving connection between the driving member 4 and hub 26 is provided in the form of segmental clutch members 29 adapted to be wedged into engagement with the interior of the hub by means of the adjacent tapered portions of lugs 14 on the nut 6.

In the operation of the brake, backward rotation of the driving member 4 causes the brake actuating nut 6 to move to the left in Fig. 1, thus moving the brake assembly to the left until the actuating member 3 enters into clutching engagement with the anchor member 2. Further movement of the nut 6 to the left causes the wedges 13 and 14 of the members 3 and 6 to enter the flared portions 11, 12 of the slots 8, 9 of the brake sleeve, thus expanding the sleeve into frictional engagement with the interior of the hub. During this expansive action of the brake cylinder 7, the flexure of the connections between the segments is distributed substantially uniformly along the connecting strips 19, 21 by reason of their substantially uniform cross section. There is thus no localization of stress, and the bending moments are well within the elastic limit of the material so that there is no danger of fatiguing the metal. The elimination of sharp corners, edges and all other features conducive to the starting of lines of failure also contributes to the improved operation of the device.

It has been found by exhaustive tests of this structure in comparison with the structure utilizing circular openings at the ends of the slots as taught by the patent to Morrow above cited, that the utilization of the principles herein disclosed multiplies the average life of the device about twenty-five times, all other structural features remaining entirely the same. Thus when the average life of the earlier type sleeve was found to be around five thousand applications of the brake, the average life of the same structure incorporating the features of the present invention was above one hundred twenty-five thousand such applications.

Although but one form of the invention has been shown and described in detail, it will be understood that other embodiments are possible and that various changes might be made in the proportions and design of the parts without departing from the spirit of the invention as defined in the claims appended hereto.

What is claimed is:

1. In a coaster brake, a cylindrical brake member having longitudinal slots extending alternately from opposite ends, said slots terminating in generally triangular openings, the bases of said triangles being arranged substantially circumferentially of the cylinder and being joined to the sides thereof by smoothly curved fillets, the surfaces of said bases and fillets being rounded at the edges and polished.

2. In a vehicle brake, an expansible cylindrical brake member in the form of a sleeve having longitudinal slots entering at one end and terminating adjacent the other end in enlarged openings formed to provide circumferentially extending strips of substantially uniform cross section joining the segments of the cylinder.

3. In a vehicle brake, an expansible cylindrical brake member in the form of a sleeve having longitudinal slots entering at one end and terminating adjacent the other end in enlarged openings formed to provide circumferentially extending strips of substantially uniform cross section joining the segments of the cylinder, said strips being joined to said segments by smoothly curved fillets, the fillets and adjacent surfaces of the strips being smoothed and polished.

FRANK T. CHRISTIAN.